United States Patent
Agrawal et al.

(10) Patent No.: US 10,552,074 B2
(45) Date of Patent: Feb. 4, 2020

(54) SUMMARIZED DATA STORAGE MANAGEMENT SYSTEM FOR STREAMING DATA

(71) Applicant: Samsung Electronics Co., Ltd., Suwon-si, Gyeonggi-do (KR)

(72) Inventors: Nitin Agrawal, San Francisco, CA (US); Ashish Vulimiri, Mountain View, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 164 days.

(21) Appl. No.: 15/632,128

(22) Filed: Jun. 23, 2017

(65) Prior Publication Data

US 2018/0088813 A1    Mar. 29, 2018

Related U.S. Application Data

(60) Provisional application No. 62/399,275, filed on Sep. 23, 2016.

(51) Int. Cl.
*G06F 13/00* (2006.01)
*G06F 3/06* (2006.01)

(52) U.S. Cl.
CPC ............ *G06F 3/064* (2013.01); *G06F 3/0623* (2013.01); *G06F 3/0602* (2013.01)

(58) Field of Classification Search
CPC .. G06F 3/064; G06F 16/24568; G06F 3/0623; G06F 11/3476; G06F 3/0602
See application file for complete search history.

(56) References Cited

U.S. PATENT DOCUMENTS

| | | | |
|---|---|---|---|
| 7,342,166 | B2 | 3/2008 | Kay |
| 7,796,781 | B2 | 9/2010 | Echigo et al. |
| 7,849,227 | B2 | 12/2010 | Kashiyama et al. |
| 7,882,087 | B2 | 2/2011 | Johnson |

(Continued)

FOREIGN PATENT DOCUMENTS

| | | |
|---|---|---|
| EP | 2709023 A1 | 3/2014 |
| WO | 2002037828 A2 | 5/2002 |

OTHER PUBLICATIONS

Cohen, E. et al., "Maintaining Time-Decaying Stream Aggregates" Jan. 25, 2005, pp. 1-16, Elsevier, United States.

(Continued)

*Primary Examiner* — Charles Rones
*Assistant Examiner* — Han V Doan
(74) *Attorney, Agent, or Firm* — Sherman IP LLP; Kenneth L. Sherman; Hemavathy Perumal

(57) ABSTRACT

One embodiment provides a method comprising storing a first set of explicitly enumerated data values in a first window data structure associated with a first time span. The method further comprises storing one or more sets of summary statistics in a second set of window data structures. Each window data structure of the second set of window data structures is associated with a time span older than the first time span. The one or more sets of summary statistics are based on a second set of data values. The method further comprises storing a third set of explicitly enumerated data values in a third set of window data structures, wherein each data value of the third set of explicitly enumerated data values is annotated.

20 Claims, 9 Drawing Sheets

(56) References Cited

U.S. PATENT DOCUMENTS

| | | | |
|---|---|---|---|
| 8,220,020 B2 | 7/2012 | Deshpande | |
| 8,527,345 B2 | 9/2013 | Rothschild et al. | |
| 8,682,925 B1 | 3/2014 | Marquardt et al. | |
| 8,745,070 B2 | 6/2014 | Krishnamurthy et al. | |
| 8,922,617 B2 | 12/2014 | Alexandrov et al. | |
| 8,954,377 B1* | 2/2015 | Turon | G06F 16/2228 707/602 |
| 9,218,382 B1 | 12/2015 | Muntes et al. | |
| 9,224,156 B2 | 12/2015 | Moorer | |
| 9,264,711 B2 | 2/2016 | Gordon et al. | |
| 9,269,015 B2 | 2/2016 | Boncyk et al. | |
| 9,272,209 B2 | 3/2016 | Perlman et al. | |
| 2005/0183123 A1* | 8/2005 | Lee | G11B 27/034 725/47 |
| 2006/0173743 A1 | 8/2006 | Bollay | |
| 2008/0109306 A1 | 5/2008 | Maigret et al. | |
| 2009/0094113 A1 | 4/2009 | Berry et al. | |
| 2010/0023398 A1 | 1/2010 | Brown et al. | |
| 2010/0088716 A1 | 4/2010 | Ellanti et al. | |
| 2011/0041153 A1 | 2/2011 | Simon et al. | |
| 2011/0153414 A1 | 6/2011 | Elvekrog et al. | |
| 2011/0173071 A1 | 7/2011 | Meyer et al. | |
| 2012/0011540 A1 | 1/2012 | Pulford et al. | |
| 2012/0167133 A1 | 6/2012 | Carroll et al. | |
| 2012/0197898 A1 | 8/2012 | Pandey et al. | |
| 2013/0073473 A1 | 3/2013 | Heath | |
| 2013/0138667 A1 | 5/2013 | DeStefano et al. | |
| 2013/0155892 A1 | 6/2013 | Cormode et al. | |
| 2014/0052540 A1 | 2/2014 | Rajaram et al. | |
| 2014/0136337 A1 | 5/2014 | Ringdahl | |
| 2014/0236729 A1 | 8/2014 | Sidi et al. | |
| 2014/0289188 A1 | 9/2014 | Shimanovsky et al. | |
| 2014/0317244 A1 | 10/2014 | Pantos et al. | |
| 2015/0081452 A1 | 3/2015 | Anthony | |
| 2015/0082203 A1 | 3/2015 | James et al. | |
| 2015/0245111 A1 | 8/2015 | Berry et al. | |
| 2015/0302470 A1 | 10/2015 | Dru et al. | |
| 2015/0350563 A1 | 12/2015 | Hendricks et al. | |
| 2016/0004750 A1 | 1/2016 | Marquardt et al. | |
| 2016/0012110 A1 | 1/2016 | Hirzel et al. | |
| 2016/0042250 A1 | 2/2016 | Cordova-Diba et al. | |
| 2016/0092484 A1 | 3/2016 | Finkler | |
| 2016/0112487 A1 | 4/2016 | Wang et al. | |

OTHER PUBLICATIONS

International Search Report and Written Opinion dated Jan. 18, 2018 for International Application PCT/KR2017/010473 from Korean Intellectual Property Office, pp. 1-7, Republic of Korea.

Extended European Search Report dated Jul. 19, 2019 for European Application No. 17853465.7 from European Patent Office, pp. 1-9, Munich, Germany.

* cited by examiner

700

701: Store a first set of explicitly enumerated data values in a sliding window associated with a first time span 702: Store one or more sets of summary statistics in one or more decayed windows, wherein each decayed window is associated with a time span older than the first time span, and the one or more sets of summary statistics are based on a second set of data values 703: Store a third set of explicitly enumerated data values in one or more landmark windows, wherein each data value of the third set is annotated

FIG. 6

SUMMARIZED DATA STORAGE MANAGEMENT SYSTEM FOR STREAMING DATA

CROSS REFERENCE TO RELATED APPLICATIONS

This application claims priority from U.S. Provisional Patent Application Ser. No. 62/399,275, filed on Sep. 23, 2016, incorporated herein by reference.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to data storage systems, and in particular, a summarized data storage management system for streaming data.

BACKGROUND

Data storage requirements for many traditional applications (e.g., enterprise, personal, and office productivity applications) include data persistence (i.e., data retention). Examples of user data that such traditional applications may rely on and that require prolonged longevity include, but are not limited to, tax returns, photos, business documents, etc.

SUMMARY

One embodiment provides a method comprising storing a first set of explicitly enumerated data values in a first window data structure associated with a first time span. The method further comprises storing one or more sets of summary statistics in a second set of window data structures. Each window data structure of the second set of window data structures is associated with a time span older than the first time span. The one or more sets of summary statistics are based on a second set of data values. The method further comprises storing a third set of explicitly enumerated data values in a third set of window data structures, wherein each data value of the third set of explicitly enumerated data values is annotated.

These and other features, aspects and advantages of the one or more embodiments will become understood with reference to the following description, appended claims and accompanying figures.

BRIEF DESCRIPTION OF THE DRAWINGS

FIG. 6 is a flowchart of an example process for data storage management implemented by a summary store, in one or more embodiments;

DETAILED DESCRIPTION

Figure 1:
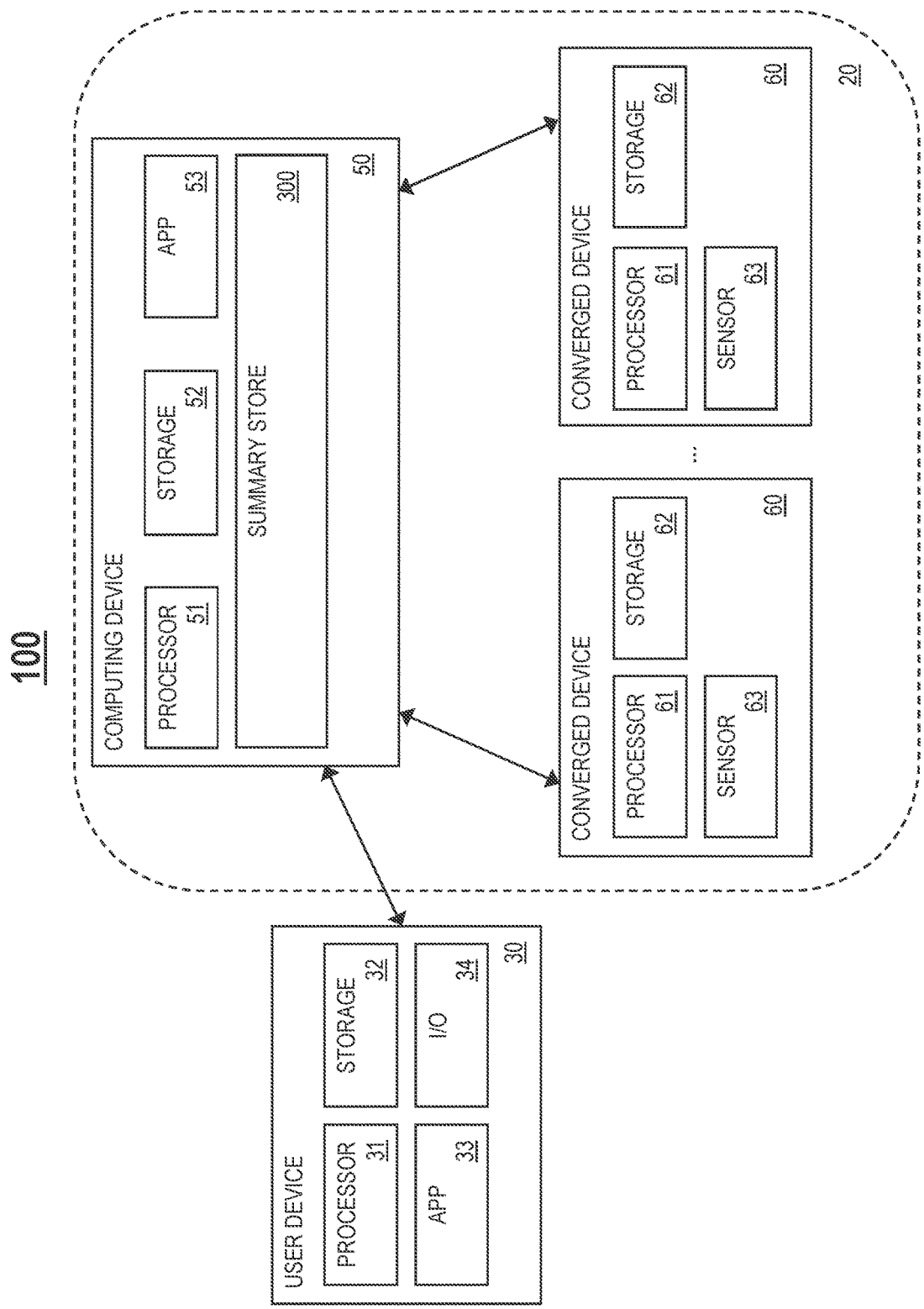
FIG. 1 illustrates an example computing framework for summarized data storage management, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

For expository purposes, let the term "summary statistic" generally denote a statistical property. The terms "summary statistic" and "statistical property" may be used interchangeably in this specification.

For expository purposes, let the term "temporal window" generally denote a data structure maintaining data associated with a portion of a data stream over a particular temporal range (i.e., time span, time interval, or contiguous chunk of time). The terms "temporal window" and "window data structure" may be used interchangeably in this specification.

One or more embodiments relate generally to data storage systems, and in particular, a summarized data storage management system for streaming data. One embodiment provides a method comprising storing a first set of explicitly enumerated data values in a first window data structure associated with a first time span. The method further comprises storing one or more sets of summary statistics in a second set of window data structures. Each window data structure of the second set of window data structures is associated with a time span older than the first time span. The one or more sets of summary statistics are based on a second set of data values. The method further comprises storing a third set of explicitly enumerated data values in a third set of window data structures, wherein each data value of the third set of explicitly enumerated data values is annotated.

In recent times, a new class of applications and user behavior has emerged with data storage requirements that are different from traditional applications. This new class of applications focus on analytics ("analytics applications") and are becoming increasingly common in a wide variety of applications scenarios such as, but not limited to, applications for converged devices in connected device ecosystems (e.g., autonomous vehicles, connected homes), large-scale data analysis (e.g., data centers), industrial automation, etc.

Such analytics applications may not require data persistence, relying instead on streaming data to perform machine learning.

Converged devices, such as Internet of Things (IoT) devices, generate data continuously as data streams. Analytics applications analyze the data streams, and generate recommendations or decisions, control the devices, and/or give feedback to users based on the analysis. As a result of high-volume data streams from connected device ecosystems, data management coupled with a need for real-time data processing and actuation becomes challenging, giving rise to cost and latency issues (e.g., increased storage space costs, increased bandwidth costs, increased latency for query responses). One important attribute of streaming data relied on by analytics applications is that the value of the data greatly diminishes over time once analytics has been performed on the data.

One embodiment provides a summarized data storage management system ("summary store") with an associated query-processing mechanism designed for analytics applications. The summary store supports data approximation and provides an approximate query interface suitable for analytics applications. Instead of storing a data stream in its entire raw format, the summary store constructs and stores a summary of the data stream. The summary represents a compact, summarized version of the data stream.

Unlike conventional data storage systems, the summary store provides the following advantages: First, the size of a summary for a data stream is significantly less than the size of the data stream itself. As stated above, the summary is a compact, summarized version of the data stream that saves orders of magnitude of storage space while maintaining a carefully-controlled set of statistical properties suitable for responding to queries. As the data stream grows in volume, the benefits of summarization of data streams become even more relevant. Even if multiple summaries are maintained over the same data stream, the cumulative size of the summaries may still be orders of magnitude smaller than the size of the data stream. The summary store results in decreased storage consumption and costs.

Second, as a smaller amount of data stored on a storage device needs to be scanned to respond to a query from an application, summaries may lead to reduction in latency for answering queries, thereby significantly reducing an amount of time to answer a query. This is particularly useful for low-latency or real-time analytics applications. The summary store reduces latency for query responses. In one embodiment, the summary store enables real-time query responses.

Third, summaries are much more compact, thereby making it amenable to store and run powerful queries on smaller devices (i.e., devices with fewer computation resources), such as, but not limited to, smartphones, wearable devices, smartwatches, televisions (TVs), home hubs, etc. The summary store decreases bandwidth (i.e., low bandwidth).

The summary store supports data management of data streams generated by connected devices in an ecosystem in a cost effective and scalable manner. The summary store reduces operational costs through substantial reduction in storage capacity and bandwidth consumption. Further, the summary store reduces latency of analytics workloads, thereby enabling more responsive, real-time, user-facing applications. Compared to traditional data storage systems, the summary store results in substantial reduction in storage capacity, enables low-latency or real-time analytics on high-volume data streams, and is applicable to a variety of machine learning and analytics-oriented applications.

The summary store supports data decay and summarization for streaming data, and estimates error bounds for approximate queries on decayed, summarized data.

In one embodiment, the summary store provides the following functionalities: (1) a windowing mechanism that unifies different types of temporal windows (e.g., sliding, decayed, and landmark windows) to represent data streams, (2) a set of decay functions for data storage and retrieval, and (3) a set of error estimation methods for determining error estimates/error bounds of query responses to approximate queries.

FIG. 1 illustrates an example computing framework 100 for summarized data storage management, in one or more embodiments. The computing framework 100 comprises one or more converged devices 60. Each converged device 60 is an electronic device including computation resources such as, but not limited to, one or more processor units 61 and one or more storage units 62. Each converged device 60 is configured to generate data continuously as data streams.

Examples of the one or more converged devices 60 include, but are not limited to, one or more of the following: display devices, desktop computers, mobile devices (e.g., tablets, laptops, smart phones, etc.), wearable devices (e.g., smart watches, smart body patches, etc.), IoT devices (e.g., smart televisions, smart vehicles, smart houses, environmental IoT home sensors, etc.), etc.

In one embodiment, a converged device 60 generates a data stream based on contextual and/or environmental data captured by at least one sensor module 63 (e.g., a camera, a microphone, etc.) integrated in or coupled to/connected with the converged device 60.

In one embodiment, the computing framework 100 further comprises a computing device 50 including computation resources such as, but not limited to, one or more processor units 51 and one or more storage units 52. One or more applications may execute/operate on the computing device 50 utilizing the computation resources of the computing device 50. In one embodiment, the applications include, but are not limited to, the following: (1) a summarized data storage management system ("summary store") 300 configured to collect one or more data streams from the one or more converged devices 60, and manage storage and querying of the one or more data streams, and (2) at least one analytics application ("app") 53 configured to query the summary store 300 for a summary statistic associated with the one or more data streams over a temporal range, and, based on a query response returned by the summary store 300, generate recommendations/decisions, control the one or more converged devices 60, and/or give feedback to one or more users.

Examples of the computing device 50 include, but are not limited to, a desktop computer, a mobile device (e.g., a tablet, a laptop, a smart phone, etc.), a set-top box, etc.

In one embodiment, the computing device 50 is configured to exchange data with the one or more converged devices 60 over a connection (e.g., a wireless connection such as a WiFi connection or a cellular data connection, a wired connection, or a combination of the two). The computing device 50 and the one or more converged devices 60 together represent a connected device ecosystem 20.

In one embodiment, the computing framework 100 further comprises a user device 30 including computation resources such as, but not limited to, one or more processor units 31 and one or more storage units 32. One or more applications may execute/operate on the user device 30 utilizing the computation resources of the user device 30. In one embodiment, the applications include, but are not limited to, at least one app 33 configured to query the summary store 300 for a summary statistic associated with the one or more data streams generated by the one or more converged devices 60 over a temporal range, and, based on a query response returned by the summary store 300, generate recommendations/decisions, control the one or more converged devices 60, and/or give feedback to one or more users (e.g., a user operating/carrying the user device 30).

In one embodiment, the user device 30 is configured to exchange data with the computing device 50 over a connection (e.g., a wireless connection such as a WiFi connection or a cellular data connection, a wired connection, or a combination of the two).

In one embodiment, the user device 30 further comprises one or more other input/output (I/O) modules 34, such as a keyboard, a keypad, a touch interface, a display screen, a remote control, etc. An I/O module 34 may be integrated in or coupled to/connected with the user device 30. A user may utilize an I/O module 34 to interact with the one or more apps 33.

Examples of the user device 30 include, but are not limited to, a desktop computer, a mobile device (e.g., a tablet, a laptop, a smart phone, etc.), a wearable device (e.g., a smart watch, smart body patches, etc.), etc.

In one embodiment, as shown in FIG. 1, the summary store 300 resides on the computing device 50. In another embodiment, the summary store 300 resides on a separate device connected to the computing device 50 such as, but not limited to, a set-top box or another type of device connected to the computing device 50. In yet another embodiment, the summary store 300 resides in an online secure cloud computing environment 200 (FIG. 2), such that management of storage and querying of data streams generated by the one or more converged devices 60 is performed remotely (i.e., not locally on a device in the connected device ecosystem 20).

Figure 2:
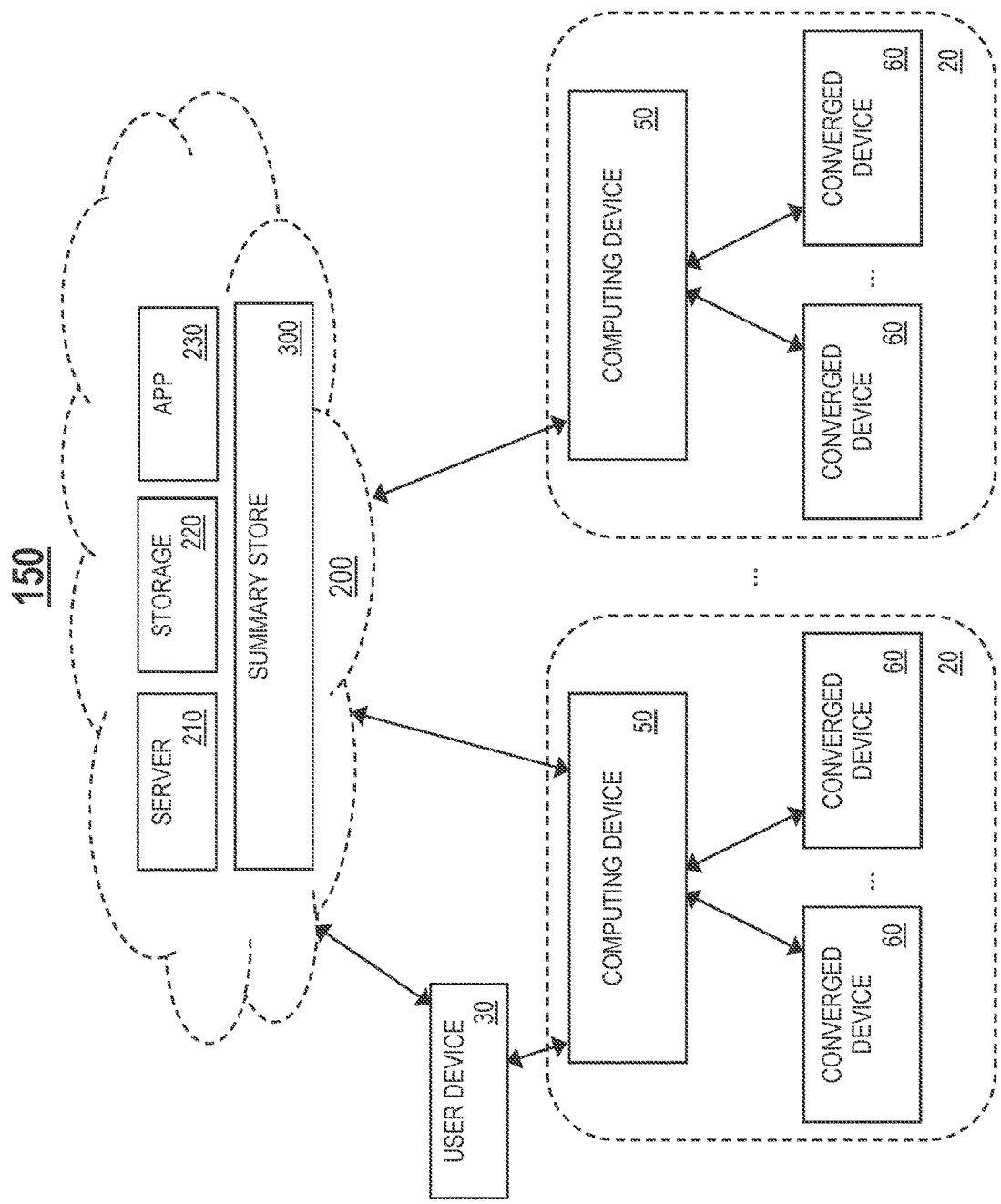
FIG. 2 illustrates another example computing framework for summarized data storage management, in one or more embodiments.

FIG. 2 illustrates another example computing framework 150 for summarized data storage management, in one or more embodiments. The computing framework 150 comprises one or more connected device ecosystems 20. Each connected device ecosystem 20 includes one or more converged devices 60 and a computing device 50 for collecting data streams generated by the one or more converged devices 60.

The computing framework 150 further comprises an online secure cloud computing environment 200 comprising computation resources such as, but not limited to, one or more server devices 210 and one or more storage devices 220. One or more applications may execute/operate on the cloud computing environment 200 utilizing the computation resources of the cloud computing environment 200. For example, unlike the computing framework 100 where the summary store 300 resides on a computing device 50 that is part of a connected device ecosystem 20, the summary store 300 in the computing framework 150 executes/operates on the cloud computing environment 200 utilizing the computation resources of the cloud computing environment 200. The summary store 300 is configured to collect data streams from different computing devices 50 of different connected device ecosystems 20, and manage storage and querying of the data streams.

In one embodiment, the cloud computing environment 200 further comprises at least one cloud-based app 230 configured to query the summary store 300 for a summary statistic associated with the data streams, and, based on a query response returned by the summary store 300, generate recommendations/decisions, control the one or more converged devices 60, and/or give feedback to one or more users.

In one embodiment, each computing device 50 of each connected device ecosystem 20 is configured to exchange data with one or more components of the cloud computing environment 200 over a connection (e.g., a wireless connection such as a WiFi connection or a cellular data connection, a wired connection, or a combination of the two).

In one embodiment, the computing framework 100 further comprises a user device 30 configured to exchange data with a computing device 50 and/or one or more components of the cloud computing environment 200 over a connection (e.g., a wireless connection such as a WiFi connection or a cellular data connection, a wired connection, or a combination of the two).

Figure 3:
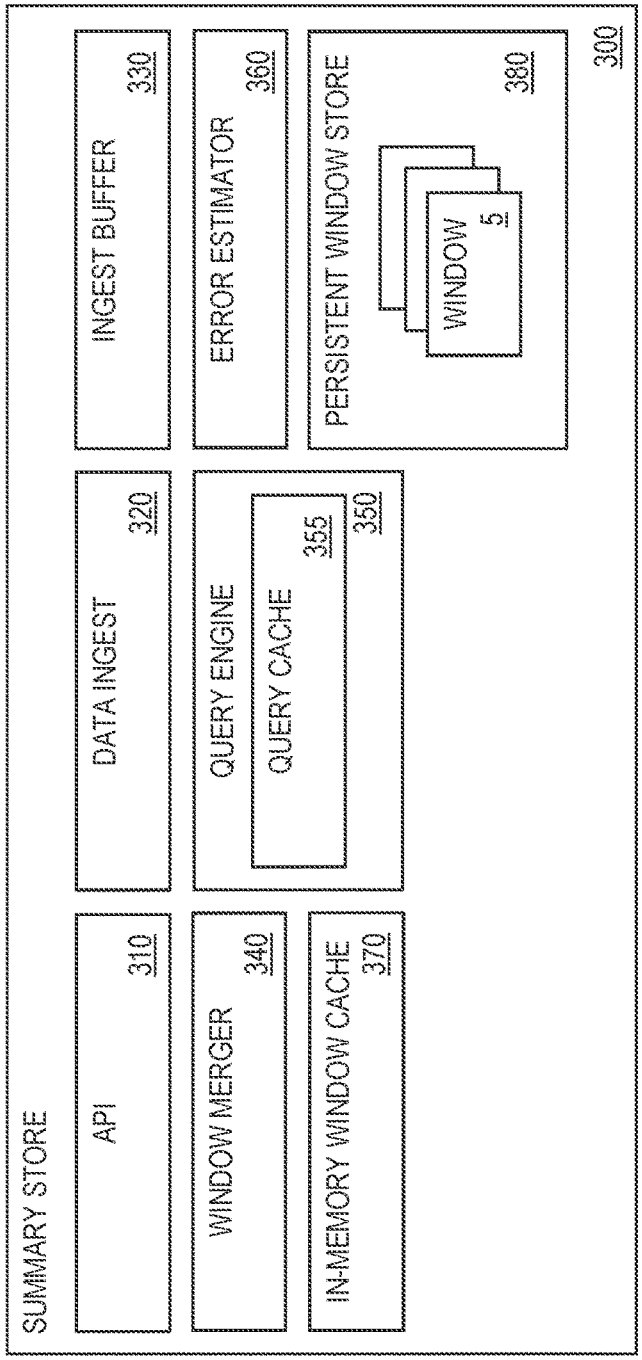
FIG. 3 illustrates an example summary store in detail, in one or more embodiments.

FIG. 3 illustrates an example summary store 300 in detail, in one or more embodiments. In one embodiment, the summary store 300 comprises a data ingest unit 320 and a window merger 340 for managing storage of one or more data streams (e.g., a data stream generated by a converged device 60) in a persistent window store 380. In one embodiment, the persistent window store 380 includes one or more persistent storage devices, such as a storage unit 52 (FIG. 1) of a computing device 50 (FIG. 1) or a storage device 220 (FIG. 2) of a cloud computing environment 200 (FIG. 2).

Figure 4:
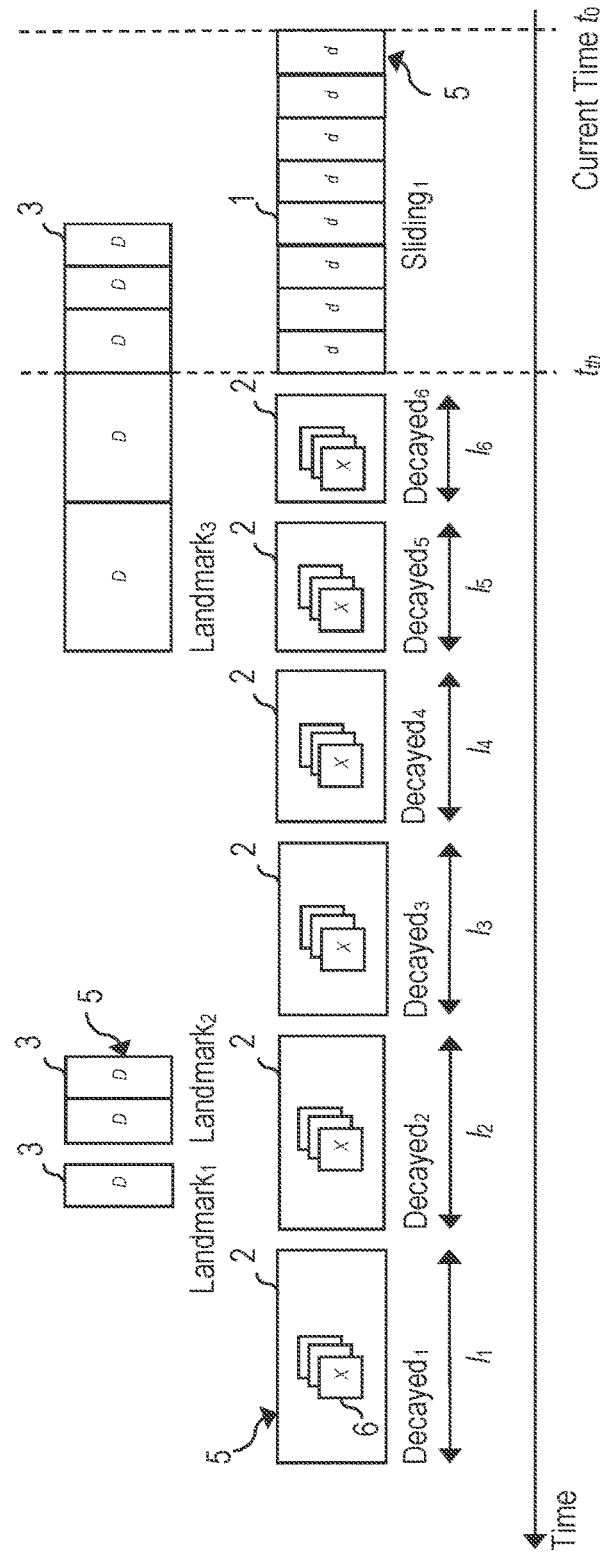
FIG. 4 illustrates an example representation of multiple temporal windows maintained by the summary store, in one or more embodiments.

In one embodiment, the data ingest unit 320 is configured to segment/organize a data stream into multiple temporal windows 5 (FIG. 4). Each temporal window 5 is associated with a particular time span, and maintains data associated with a portion of the data stream over the particular time span. As described in detail later herein, the multiple temporal windows 5 comprise: (1) at least one temporal window 5 associated with a particular time span and maintaining one or more explicitly enumerated data values included in a portion of the data stream over the particular time span, and (2) at least one other temporal window 5 associated with a different time span and maintaining one or more data summaries 6 (FIG. 4) of a different portion of the data stream over the different time span. The temporal windows 5 are maintained and stored in the persistent window store 380.

In one embodiment, a data summary 6 associated with a particular time span represents a compact, summarized version of a portion of a data stream over the particular time span. The data summary 6 is a statistical transformation of the portion of the data stream, and comprises a set of summary statistics measured over all individual data values included in the portion of the data stream. The data summary 6 supports temporal analyses and may be used to generate query responses to different queries from apps (e.g., an app 230 in a cloud computing environment, an app 53 on a computing device 50, or an app 33 on a user device 30). The data summary 6 may include, but is not limited to, one or more of the following summary statistics: (1) an average (avg) of the data values included in the portion of the data stream, (2) a maximum (max) of the data values, (3) a minimum (min) of the data values, (4) a total sum (sum) of the data values, (5) a total count (count) of the data values, and (6) one or more probabilistic data structures, such as a Count-min sketch (Count-min sketch) or a Bloom filter (Bloom filter) representing a frequency table of the data values or events represented by the data values, a histogram, a q-digest (Q-Digest) of approximate quantiles on the data values, etc.

In one embodiment, the summary store 300 maintains a default set of data summaries 6 for each data stream, and constructs one or more additional data summaries 6 for the data stream on demand. For example, in accordance with data storage requirements for a particular app, the app may instruct the summary store 300 to construct one or more additional data summaries 6 for a data stream.

In one embodiment, each data summary 6 is maintained as a first-class data object stored directly on a persistent storage device (e.g., a storage unit 52 of a computing device 50, a storage device 220 of a cloud computing environment 200, etc.).

As described in detail later herein, in one embodiment, in response to receiving new data that is part of a data stream, the data ingest unit 320 enqueues/buffers the new data in an ingest buffer 330 before appending the new data to the persistent window store 380.

In one embodiment, the data ingest unit 320 caches one or more of the temporal windows 5 in an in-memory window cache 370. The in-memory window cache 370 provides temporary storage space that allows fast access to the cached temporal windows 5.

As a result of summarization of the one or more data streams, the summary store 300 exhibits graceful decay to capture temporally diminishing utility of the one or more data streams. The data ingest unit 320 allocates/assigns progressively smaller storage space (e.g., byte representations) to data as the data ages over time. As a portion of a data stream ages, the aged portion is subsumed into at least one temporal window 5 associated with an older time span. As described in detail later herein, in one embodiment, the window merger 340 is configured to merge one or more temporal windows 5 based on one or more decay functions that control a nature and rate of data decay exhibited by the summary store 300.

In one embodiment, the summary store 300 comprises a query engine 350 for managing querying of the one or more data streams. Specifically, the query engine 350 is configured to: (1) receive, from an app (e.g., an app 230 in a cloud computing environment, an app 53 on a computing device 50, or an app 33 on a user device 30), a query for a summary statistic associated with the one or more data streams over a particular temporal range, and (2) return a query response to the query received.

In one embodiment, the query engine 350 maintains a query cache 355 comprising one or more cached query responses previously returned by the query engine 350. In response to receiving a query for a summary statistic associated with the one or more data streams over a particular temporal range, the query engine 350 determines whether the query cache 355 maintains a cached query response for the query. If there is a cached query response for the query, the query engine 350 returns the cached query response. As described in detail later herein, if there is no cached query response for the query, the query engine 350 generates a new query response based on data maintained by at least one temporal window 5 that overlaps the particular temporal range. In one embodiment, the query engine 350 accesses the in-memory window cache 370 to retrieve data (e.g., explicitly enumerated data values and/or data summaries 5) maintained by one or more cached temporal windows 5 that overlap the particular temporal range. If at least one temporal window 5 that overlaps the particular temporal range is not cached in the in-window memory cache 370 (i.e., a cache miss), the query engine 350 accesses the persistent window store 380 to retrieve data maintained by the at least one temporal window 5.

In one embodiment, the query engine 350 generates a query response for a query based on at least one summary statistic included in at least one data summary 6 maintained by at least one temporal window 5 overlapping a particular temporal range of the query. For example, if an app queries for an average daily temperature of a smart house, the query engine 350 may return a query response based on the summary statistic avg. As another example, if an app queries for frequency of events, the query engine 350 may return a query response based on the summary statistic Count-min sketch.

For approximate query-processing (AQP) systems, certain types of queries cannot be answered precisely (i.e., approximate queries). Error estimates are important for approximate queries. Without error estimates, there is no reliable mechanism to ascertain the quality of the response, thereby making it hard to build useful and realistic apps with such traditional AQP systems.

In one embodiment, the summary store 300 provides error estimates for query responses to approximates queries. In one embodiment, in addition to a query response comprising an answer to a query or an estimate of the answer, the query engine 350 is configured to return an error estimate representing a probabilistic measure of confidence in the answer (i.e., an error bound for the query response). As described in detail later herein, the summary store 300 comprises an error estimator 360 configured to apply an error estimation method to generate an error estimate for a query response to an approximate query.

In one embodiment, the summary store 300 comprises an application programming interface (API) 310 configured to: (1) receive a request to append new data (e.g., one or more new data values) that is part of a data stream to the persistent window store 380, and (2) receive a query for a summary statistic associated with the one or more data streams over a particular temporal range. The API 310 provides a unified query interface for querying both recent data and historical data maintained by the persistent window store 380. The API 310 allows a user (e.g., an application developer) to assume an entire data stream (e.g., a data stream generated by a converged device 60) is available at the summary store 300, and pose/submit a query to the summary store 300 with such an assumption without having to worry about an underlying data storage management technique employed by the summary store 300 (i.e., summarization of historical data).

In one embodiment, the API 310 is configured to permit a user to plug-in one or more arbitrary data structures that specify one or more user-defined summary statistics. The data ingest unit 320 is configured to construct a data summary 6 that includes the one or more user-defined summary statistics.

In one embodiment, the API 310 is pre-installed with a package of pre-defined summary statistics (e.g., avg, min, max, count, sum, Bloom filter, Count-min sketch, Q-Digest, etc.) that provide built-in support for different types of queries from different apps (e.g., queries such as count, sum, average, existence, frequency, quantile, etc.). Each data summary 6 constructed by the data ingest unit 320 includes the pre-defined summary statistics.

FIG. 4 illustrates an example representation 400 of multiple temporal windows 5 maintained by the summary store 300, in one or more embodiments. In one embodiment, the data ingest unit 320 segments/organizes a data stream into at least three different types of temporal windows 5: (1) a sliding window 1, (2), one or more decayed windows 2, and (3) one or more landmark windows 3.

Let $t_0$ denote a current time point, let $t_{th}$ denote a pre-determined prior time point occurring before the current time point $t_0$ (i.e., the pre-determined prior time point $t_{th}$ has already elapsed), and let $[t_0, t_{th}]$ denote a time span with the time points $t_0$ and $t_{th}$ as endpoints For expository purposes, let the terms "most recent window" and "newest window" generally denote a temporal window associated with the time span $[t_0, t_{th}]$, and let the term "most recent data" generally denote a portion of the data stream over the time span $[t_0, t_{th}]$. The sliding window 1 represents the most recent/newest window, and maintains the most recent data of the data stream.

In one embodiment, the sliding window 1 maintains the most recent data of the data stream in its raw format (i.e., without summarization). Let d generally denote an individual data value (i.e., a data point or a data element) included in the data stream. All individual data values included in the most recent data are explicitly enumerated in the sliding window 1. As a significant fraction/portion of queries received from apps (e.g., an app 230 in a cloud computing environment, an app 53 on a computing device 50, or an app 33 on a user device 30) pertain to the most recent data, maintaining the most recent data in full resolution in the sliding window 1 allows the query engine 350 to respond to such queries with a higher-degree of accuracy but at relatively modest storage costs.

Let X generally denote a data summary 6. In one embodiment, once a portion of the data stream ages past the pre-determined prior time point $t_{th}$, the data ingest unit 320 initiates summarization of the aged portion by constructing a sequence of decayed windows 2. The decayed windows 2 are associated with different time spans that do not overlap.

Specifically, each decayed window 2 is associated with a particular time span occurring before the time span $[t_0, t_{th}]$, and maintains one of more data summaries X for the associated time span. Unlike the sliding window 1 that maintains raw data in full resolution, each data summary X for an associated time span represents a compact, summarized version of a portion of the data stream over the associated time span, and comprises a configurable set of summary statistics over all individual data values included in the portion of the data stream.

For expository purposes, let the term "older window" generally denote a decayed window 2 associated with an older time span, and let the term "newer window" generally denote a decayed window 2 associated with a newer time span, wherein the newer time span occurs after the older time span (i.e., the newer time span is more recent than the older time span). For expository purposes, let the term "oldest window" generally denote a decayed window 2 associated with an oldest time span that the summary store 300 maintains data for.

As stated above, the data ingest unit 320 allocates/assigns progressively smaller storage space (e.g., byte representations) to data as the data ages over time. Specifically, in one embodiment, one or more older decayed windows 2 are associated with larger time spans than one or more newer decayed windows 2. As data ages, the data is subsumed into one or more older decayed windows 2 via the window merger 340.

Each temporal window 5 associated with a time span has a corresponding window size representing an interval of time (i.e., length of time) covered by the associated time span.

As shown in FIG. 4, the data ingest unit 320 constructs the following sequence of decayed windows 2: $Decayed_1$, $Decayed_2$, $Decayed_3$, $Decayed_4$, $Decayed_5$, and $Decayed_6$ in order from oldest window to newer window, wherein $Decayed_1$ has a corresponding window size $l_1$, $Decayed_2$ has a corresponding window size $l_2$, $Decayed_3$ has a corresponding window size $l_3$, $Decayed_4$ has a corresponding window size $l_4$, $Decayed_5$ has a corresponding window size $l_5$, $Decayed_6$ has a corresponding window size $l_6$, and $l_1 > l_2 > l_3 > l_4 > l_5 > l_6$ (e.g., $l_6=64$, $l_5=32$, $l_4=16$, $l_3=8$, $l_2=4$, and $l_1=2$). The decayed windows 2 have different windows sizes but the same storage costs.

For expository purposes, let the term "landmark value" generally denote a data value included in a data stream that is annotated/marked (e.g., annotated/marked as "important" or "special"). In one embodiment, if landmark values are deemed of more importance, the landmark values are maintained in higher resolution than data values subsumed into decayed windows 2. For example, for a data stream captured by a sensor module coupled to a door and representing events indicative of opening/closing of the door, a particular set of events included in the data stream may represent an anomaly (e.g., a break-in); data values associated with this particular set of events may be as annotated/marked to designate the data values as landmark values.

Let D generally denote a landmark value. In one embodiment, the summary store 300 may provide an annotation mechanism/functionality via the API 310 that a user/app may use to explicitly specify which data values are landmark values. For example, a user/app may specify a particular timestamp pair <begin, end> via the annotation mechanism/functionality, wherein begin and end generally denote a beginning time point and an ending time point, respectively, of a time span that a set of landmark values span. In another embodiment, the summary store 300 is configured to automatically identify one or more landmark values included in a data stream (i.e., the landmark values need not be annotated/marked beforehand). For example, the summary store 300 may automatically identify one or more landmark values based on how anomalous the landmark values appear in the data stream (e.g., the landmark values appear anomalous if the landmark values are two or more standard deviations distant from an instantaneous running mean, etc.).

In one embodiment, each data value D is not decayed (i.e., subsumed into a decayed window 2). Instead, the data ingest unit 320 is configured to construct one or more landmark windows 3, and store each data value D in one of the landmark windows 3. Each landmark window 3 is associated with a particular time span, and maintains one or more explicitly enumerated data values D spanning the associated time span.

In one embodiment, the sliding window 1 and each landmark window 3 maintains raw data in full resolution (i.e., data values are explicitly enumerated). In another embodiment, to reduce storage consumption, data maintained in the sliding window 1 and/or each landmark window 3 is decayed similar to data maintained in each decayed window 2.

A query over a particular temporal range may be expressed as either $<t_{begin}, t_{end}>[s]<par>$, wherein $<t_{begin}, t_{end}>$ generally denotes a timestamp pair comprising a beginning time point $t_{begin}$ and an ending time point $t_{end}$ of the particular temporal range, s generally denotes a summary statistic being queried (e.g., a user-defined summary statistic or a pre-defined summary statistic such as avg), and <par> generally denotes a set of additional parameters, if any, specific to the query.

Let U generally denote a first set of data values, let V generally denote a second set of data values, let $s_u$ generally denote a first instance of a summary statistic s for the first set U, let $s_v$ generally denote a second instance of the same summary statistic s for the second set V, let $U \cup V$ generally denote a union of the first set U and the second set V, and let $s_{uv}$ generally denote a third instance of the same type of summary statistic s for the union U∪V. In one embodiment, the summary store 300 supports storing and querying the summary statistic s as long as the following condition is satisfied: the instance $s_{uv}$ can be obtained from a union of the instances $s_u$ and $s_v$ and without access to raw data of the sets U and V (i.e., without access to explicitly enumerated data values included in the sets U and V). For example, the summary statistic count is a valid type of summary statistic satisfying the condition if $count_{uv}$ is defined as a sum of $count_u$ and $count_v$, wherein $count_u$ is a first instance of the summary statistic count for the first set U, $count_v$ is a second instance of the summary statistic count for the second set V, and $count_{uv}$ is a third instance of the summary statistic count for the union U∪V.

In one embodiment, the data ingest unit 320 is configured to control a nature and rate of data decay ("decay rate") exhibited by the summary store 300 based on one or more decay functions. A decay rate represents a degree of summarization applied to one or more explicitly enumerated data values in the sliding window 1 to obtain a corresponding data summary X and subsume the one or more explicitly enumerated data values into a decayed window 2. In one embodiment, a decay function is configurable (e.g., by analytics applications).

In one embodiment, a decay function may be expressed as a sequence of decayed windows 2 with different window sizes. One or more explicitly enumerated data values include in the sliding window 1 are subsumed into a decayed window 2 at a decay rate controlled by pattern of growth of window sizes of the sequence of decayed windows 2. For example, assume the data ingest unit 320 constructs, for a data stream, k decayed windows 2 with a sequence of different window sizes, wherein k is an integer, each window size of the sequence is a power of 2 (i.e., the sequence is 1, 2, 4, 8, 16, . . . ), and each decayed window 2 maintains a data summary X for up to $O(2^k)$ data values. For n data values, the data ingest unit 320 constructs $O(\log_2 n)$ windows in total, wherein n is an integer. In one embodiment, the rate of growth of window sizes of the sequence of decayed windows 2 is exponential.

In one embodiment, the data ingest unit 320 is configured to: (1) receive user input specifying an arbitrary sequence of window sizes (e.g., the user input may be plugged in via the API 310), and (2) construct a sequence of decayed windows 2 based on the user input.

Let RationalPower(p, q, R, S) generally denote an example decay function defined as a sequence of decayed windows 2 with different window sizes, wherein p, q, R, and S are integers. In one embodiment, the summary store 300 constructs a sequence of decayed windows 2 with different window sizes in accordance with expression (1) provided below:

RationalPower(p,q,R,S):=R windows with window size $S, R*2^{p-1}$ windows with window size $S*2^q$, . . . ,$R*k^{p-1}$ windows with window size $k^q$, (1), wherein the summary store 300 supports $O(n^c)$ rate of growth of window sizes of the decayed windows 2, c is an arbitrary rational, and 0≤c≤1.

Let $store_{size}$ generally denote a size of the persistent window store 380. In one embodiment, an approximation of $store_{size}$ after n data values are appended to the persistent window store 380 is computed in accordance with equation (2) provided below:

$$store_{size} \approx (1/S)*(n/R)^{p/(p+q)}$$ (2).

Figure 5:
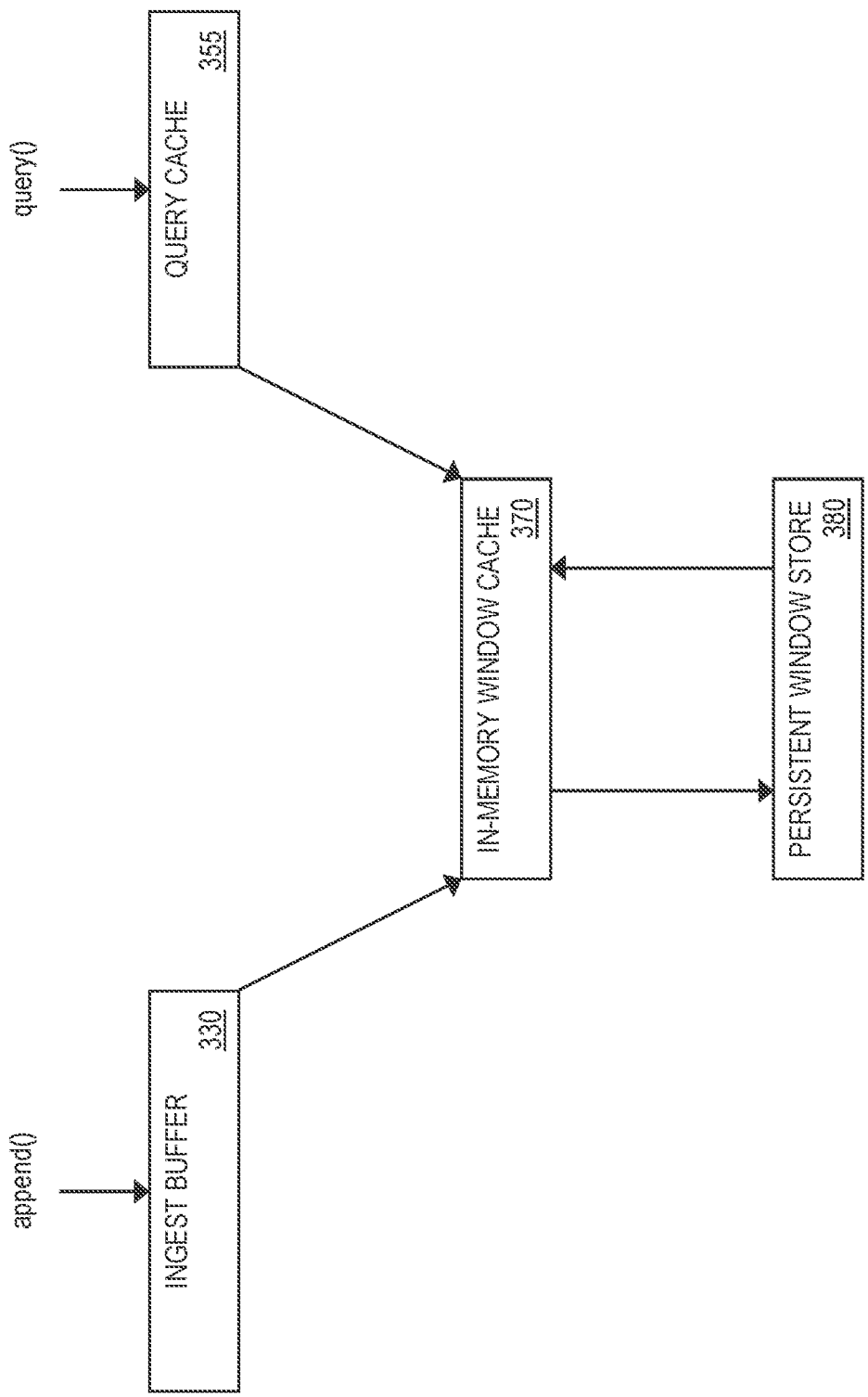
FIG. 5 illustrates an example process implemented by the summary store for storing and querying one or more data streams, in one or more embodiments.

FIG. 5 illustrates an example process implemented by the summary store 300 for storing and querying one or more data streams, in one or more embodiments. In one embodiment, the data ingest unit 320 is configured to: (1) receive a request to append one or more new data values to the persistent window store 380, (2) enqueue/buffer the one or more new data values in the ingest buffer 330, and (3) ingest the one or more new data values by incrementally appending all data values included in the ingest buffer 330 to the persistent window store 380. In one embodiment, the data ingest unit 320 ingests the one or more new data values in response to one of the following: the ingest buffer 330 is full, or a flush operation on the ingest buffer 330 is called. Over time, each ingested data value is eventually subsumed by a data summary X maintained by a decayed window 2 of the persistent window store 380.

In one embodiment, the data ingest unit 320 applies an algorithm to append a new data value to the persistent window store 380. Table 1 below provides pseudo-code for an example algorithm applied by the data ingest unit 320 to append a new data value to the persistent window store 380.

TABLE 1

Parameters:
    $C_s$ ← total capacity/size of sliding window
    D ← target decay function expressed as a sequence of window
    sizes/lengths (e.g., [1, 2, 4, 8, 16, 32, ...])
On append(t, v, isLandmark)
    If (isLandmark)
        If (last appended value was a landmark)
            L ← last landmark window
        Else
            L ← new landmark window
        L.append(t, v)
    SlidingWindow.enqueue(t, v)
    If (SlidingWindow.size( ) > $C_s$)
        (t', v') ← SlidingWindow.dequeue( )
        W ← new decayed window
        If (not isLandmark)
            W.append(t', v')
        //In one embodiment, this Forall loop is optimized using a
        Fibonacci heap data structure keyed on endpoints of decayed
        windows
        Forall consecutive decayed windows (W1, W2)
            If there exists an $m^{th}$ target decayed window such that
            D[0] + D[1] + ... + D[m] ≤ W1.startpoint <
            W2.endpoint < D[0] + D[1] + ... + D[m+1]
                merge(W1, W2) //Merge W1 and W2 if both are
                completely contained inside the $m^{th}$ target decayed
                window In one embodiment, as shown in Table 1, for each data value v in the ingest buffer 330, the data ingest unit 320 calls function append(ts, v, isLandmark), wherein ts generally denotes a timestamp of the data value v, and isLandmark generally denotes a Boolean value indicative of whether the data value v is a landmark value. If the data value v is a landmark value, the data ingest unit 320 selects a particular landmark window L, and calls function L.append(ts, v) to append the data value v to the selected landmark window L. If a last appended data value (i.e., a data value appended before the current data value v) is a landmark value, the selected landmark window L is a last landmark window 3 that the last appended data value is appended to; otherwise, the selected landmark window L is a new landmark window 3 (i.e., the data ingest unit 320 constructs a new landmark window 3).

The data ingest unit 320 calls function SlidingWindow.enqueue(ts, v) to enqueue the data value v in the sliding window 1 at a time point corresponding to the timestamp ts. If a current size of the sliding window 1 exceeds a pre-determined threshold value (e.g., a total capacity/size $C_s$ of the sliding window 1), the data ingest unit 320 calls function SlidingWindow.dequeue( ) to dequeue an oldest data value v' in the sliding window 1 with timestamp t'. The data ingest unit 320 constructs a new decayed window W. If the data value v' is not a landmark value, the data ingest unit 320 calls function W.append(t', v') to append the data value v' to the decayed window W.

For all consecutive decayed windows 2 maintained by the persistent window store 380, the data ingest unit 320 invokes the window merger 340 to merge a pair of consecutive decayed windows W1 and W2 if both decayed windows W1 and W2 are completely contained inside a $m^{th}$ target decayed window.

In one embodiment, the query engine 350 is configured to: (1) receive a query over a particular temporal range, (2) if the query cache 355 maintains a cached query response for the query, return the cached query response, (3) if the query cache 355 does not maintain a cached query response for the query, generates a new query response based on data maintained by at least one temporal window 5 that overlaps the particular temporal range. In one embodiment, the query engine 350 accesses the in-memory window cache 370 to retrieve data (e.g., explicitly enumerated data values and/or data summaries 6) maintained by one or more cached temporal windows 5 that overlap the particular temporal range. If at least one temporal window 5 that overlaps the particular temporal range is not cached in the in-window memory cache 370 (i.e., a cache miss), the query engine 350 accesses the persistent window store 380 to retrieve data maintained by the at least one temporal window 5.

In one embodiment, the query engine 350 applies an algorithm to generate a query response in response to a query over a particular temporal range. Table 2 below provides pseudo-code for an example algorithm applied by the query engine 350 to generate a query response in response to a query over a particular temporal range.

TABLE 2

On query($t_{begin}$, $t_{end}$, s, par)
    $W_p \leftarrow$ all landmark windows & data values in sliding window that overlap temporal range [$t_{begin}$, $t_{end}$]
    $R_p \leftarrow W_p$.query(s, par)
    If [$t_{begin}$, $t_{end}$] is completely covered by $W_p$
        Return (answer = $R_p$, error = 0)
    Else TABLE 2-continued $W_d \leftarrow$ all decayed windows that overlap [t0, t1]
$R_d \leftarrow W_d$.query(s, par)
$E_d \leftarrow W_d$.estimate_error(s, par)
Return (answer = $R_p \cup R_d$, error = $E_d$)

In one embodiment, as shown in Table 2, in response to receiving a query of a summary statistic s with additional parameters par over a temporal range [$t_{begin}$, $t_{end}$], the query engine 350 generates a first query response $R_p$ based on a set of explicitly enumerated data values included in all landmark windows 3 and the sliding window 1 that overlap the temporal range [$t_{begin}$, $t_{end}$]. If the temporal range [$t_{begin}$, $t_{end}$] is completely covered by the set of explicitly enumerated data values, the query engine 350 returns: (1) the first query response $R_p$ as an answer to the query, and (2) an error estimate of 0. The query engine 350 need not generate an error estimate as the first query response $R_p$ is generated based on raw data in full resolution. In one embodiment, an error estimate is configurable (e.g., by analytics applications).

If the temporal range [$t_{begin}$, $t_{end}$] is not completely covered by the set of explicitly enumerated data values, the query engine 350 generates a second query response $R_d$ based on a set of data summaries 6 included in all decayed windows 2 that overlap the temporal range [$t_{begin}$, $t_{end}$]. Further, the query engine 350 invokes the error estimator 360 to generate an error estimate $E_d$ for the second query response $R_d$. The query engine 350 returns: (1) a union of the first query response $R_p$ and the second query response $R_d$ as an estimate of an answer to the query, and (2) the error estimate $E_d$.

Table 3 below summarizes different statistical error estimation methods applied by the error estimator 360 to generate error estimates for different types of approximate queries. Let a generally denote an age of a data value, let t generally denote an interarrival time, let v generally denote a data value or an event represented by the data value, let C generally denote the summary statistic count over an entire temporal window, let T generally denote a temporal range/time span associated with a temporal window, and let S generally denote the summary statistic sum over an entire temporal window. An age a of a data value represents an amount/period of time that has elapsed since creation of the data value. An interarrival time t represents an amount/period of time between creation of two successive data values.

TABLE 3

| Query | Per-Window Aggregates (i.e., Summary Statistic s) | Distribution of Answer to Query | Error Estimate for Answer to Query |
| --- | --- | --- | --- |
| count[a, a + t] (generic) | Count | $N$ ($C\ t/T$, $(\sigma_t/\mu_t)^2$ $(T/\mu_t)$ $(t/T)$ $(1 - t/T)$), wherein N is normal distribution, $\mu_t$ is mean for t, and $\sigma_t$ is standard deviation for t | Confidence interval |
| count[a, a + t] (Poisson) | count | $B$ ($C\ t/T$), wherein B is Binomial distribution | Confidence interval |
| sum[a, a + t] | count, cum | $N$ ($S\ t/T$, $(\sigma_t^2/\mu_t^2 + \sigma_v^2/\mu_v^2)$ $(T\ \mu_v^2/\mu_t)$ $(t/T)$ $(1 - t/T)$), wherein $\mu_v$ is mean for v, and $\sigma_v$ is standard deviation for v | Confidence interval |
| frequency(v)[a, a + t] | count, Count-min sketch | Hypergeom(C, S, V), wherein S is normal distribution of count[a, a + | Confidence interval |

TABLE 3-continued

| Query | Per-Window Aggregates (i.e., Summary Statistic s) | Distribution of Answer to Query | Error Estimate for Answer to Query |
|---|---|---|---|
| | | t] (as provided above), and V is distribution over frequency(v) (i.e., entire window) | |
| exists(v)[a, a + t] | count, Count-min sketch | Hypergeom(C, S, V) | False positive probability = P, wherein P is probability Hypergeom(C, S, V) > 0 |
| exists(v)[a, a + t] | Bloom filter with false positive probability p | | False positive probability = p * t/T |

Table 4 below provides an example theorem and corresponding proof for query count[a, a+t].

TABLE 4

Theorem 1

In absence of information localizing events to specific positions inside a temporal window, count_est(a, a + t) ≈ C * t/T, wherein count_est(a, a + t) is an estimate of an answer to the query count (a, a + t).
Define count_est(a, a + t) = E[count[a, a + t] | all information available], where E generally denotes an expected value of a random variable (in this case, the random variable is the summary statistic count).
If count_est(a, a + t) only depends on length of time interval t and not age a (i.e., age independent), then count_est(a, a + t) = C * t/T.
Proof for Theorem 1

Divide time interval [0, T] into T/ε bins, each bin of size ε. If count_est(a, a + t) is age-independent, count_est for each bin should be identical. By linearity of expectation, count_est(bin) = C/(T/ε). As temporal range [a, a + t] roughly overlaps t/ε of the bins, count_est(a, a + t) ≈ (t/ε) * C/(T/ε) = C * t/T.

Table 5 below provides another example theorem and corresponding proof for query count[a, a+t].

TABLE 5

Theorem 2

If data stream arrivals are a renewal process with independent and identically distributed (i.i.d.) interarrival times t having finite mean $\mu_t$ and variance $\sigma_t^2$, for a fixed t/T > 0, a Bayesian posterior distribution B converges to normal distribution as limit T → 0.
P (count[0, t] | count[0, T] = C and renewal process) → N (C t/T, $(\sigma_t/\mu_t)^2$ (T/$\mu_t$) (t/T) (1 − t/T)),
Proof for Theorem 2

Rely on two approximations:
1. Data stream arrivals in [0, t] and [t, T] are roughly independent. Strictly, the data stream arrivals are coupled together by one interarrival time going over time instant t for all interarrival distributions except exponential (which is memoryless).
2. For a window [a, a + L], distribution of an answer to query count (a, a + t) may be approximated as N (L/$\mu_t$, $(\sigma_t/\mu_t)^2$ * (L/$\mu_t$))

Table 6 below provides an example theorem and corresponding proof for query sum[a, a+t].

TABLE 6

Theorem 3

If data stream arrivals are a renewal-reward process with independent and identically distributed (i.i.d.) interarrival times t and i.i.d. values v, joint conditional distribution of sub-interval count and sum (count[0, t], sum[0, t]), conditioned on (count[0, T], sum[0, T]) = (C, S), converges to bivariate normal with mean (C * t/T, S * t/T), and covariance matrix = t/T * (1 − t/T) * T * unconditioned covariance matrix of (count[0, 1], sum[0, 1]).
Proof for Theorem 3

Rely on same two approximations as provided above for Theorem 2.
Define
    (N, V) := (count[0, t] sum[0, t])
    (N', V') := (count[t, T], sum[t, T])
    (M, W) := (N + N', V + V') = (count[0, T], sum[0, T])
    K := covariance matrix of (N, V)/T
For multivariate normal distribution (N, V, M, W),
    mean = 1/$\mu_t$ * [t, t $\mu_v$, T, T $\mu_v$]
    covariance matrix = [[t K, t K], [t K, T K]]
Condition on (M, W) = (C, S)

FIG. 6 is a flowchart of an example process 700 for data storage management implemented by a summary store, in one or more embodiments. In process block 701, store a first set of explicitly enumerated data values in a sliding window associated with a first time span. In process block 702, store one or more sets of summary statistics in one or more decayed windows, wherein each decayed window is associated with a time span older than the first time span, and the one or more sets of summary statistics are based on a second set of data values. In process block 703, store a third set of explicitly enumerated data values in one or more landmark windows, wherein each data value of the third set is annotated.

In one embodiment, process blocks 701-703 may be performed by one or more components of the summary store 300, such as, but not limited to, the data ingest unit 320.

Figure 7:
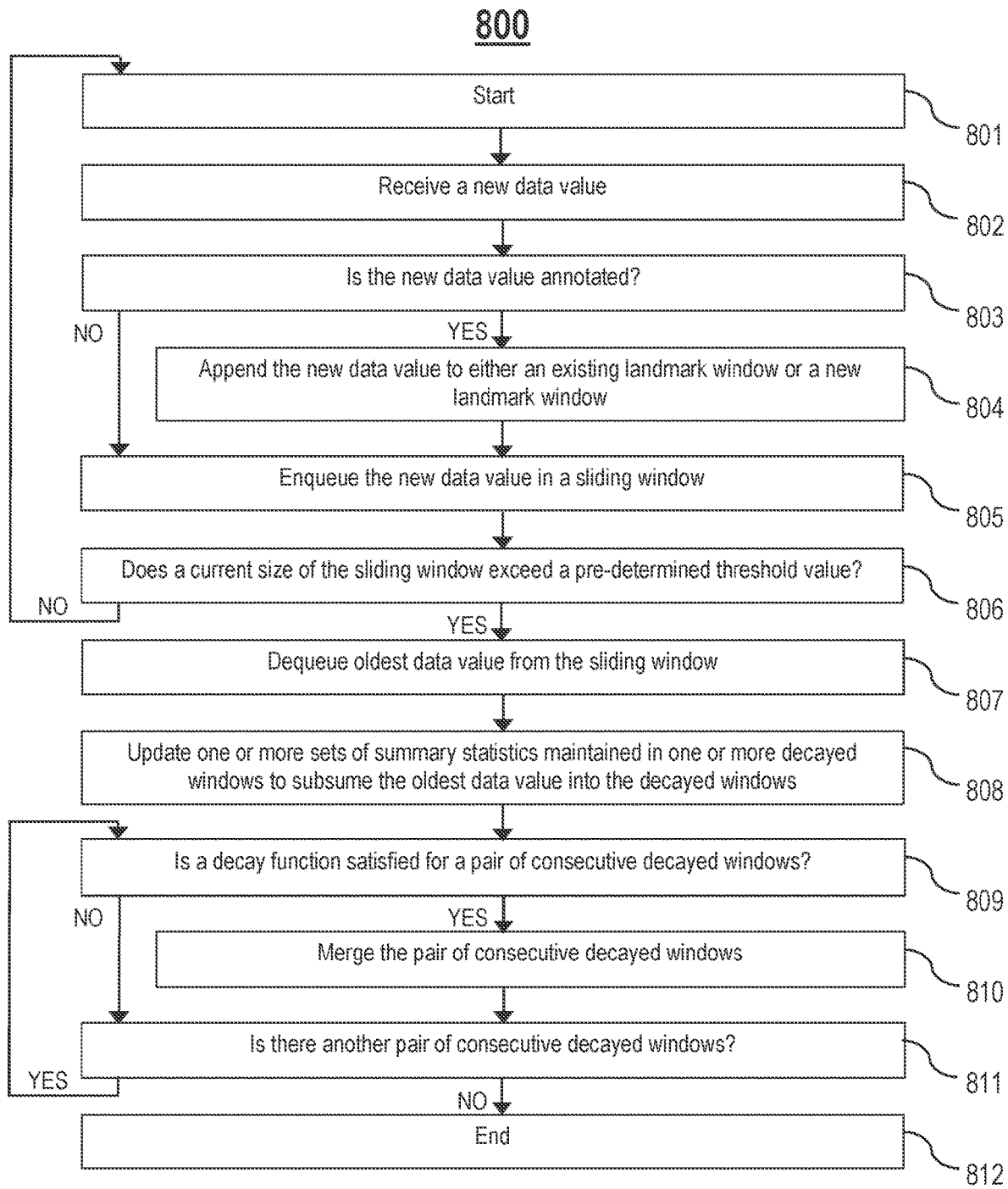
FIG. 7 is a flowchart of an example process for adding a new data value to a window store maintained by a summary store, in one or more embodiments.

FIG. 7 is a flowchart of an example process 800 for adding a new data value to a window store maintained by a summary store, in one or more embodiments. In process block 801, the process 800 starts. In process block 802, receive a new data value. In process block 803, determine whether the new data value is annotated. If the new data value is annotated, proceed to process block 804. If the new data value is not annotated, proceed to process block 805.

In process block 804, append the new data value to either an existing landmark window or a new landmark window. In process block 805, enqueue the new data value in a sliding window.

In process block 806, determine whether a current size of the sliding window exceeds a pre-determined threshold value (e.g., a pre-determined parameter indicative of a total capacity/size of the sliding window). If the current size of the sliding window exceeds the pre-determined threshold value, proceed to process block 807. If the current size of the sliding window does not exceed the pre-determined threshold value, return to process block 801.

In process block 807, dequeue an oldest data value from the sliding window. In process block 808, update one or more sets of summary statistics maintained in one or more decayed windows to subsume the oldest data value into the decayed windows.

In product block 809, determine whether a decay function is satisfied for a pair of consecutive decayed windows. If the decay function is satisfied, proceed to process block 810. If the decay function is not satisfied, proceed to process block 811.

In process block 810, merge the pair of consecutive decayed windows. In process block 811, determine whether there is another pair of consecutive decayed windows. If there is another pair of consecutive decayed windows, return to process block 809. If there is not another pair of consecutive decayed windows, proceed to process block 812.

In process block 812, the process 800 ends.

In one embodiment, process blocks 801-812 may be performed by one or more components of the summary store 300, such as, but not limited to, the data ingest unit 320 and the window merger 340.

Figure 8:
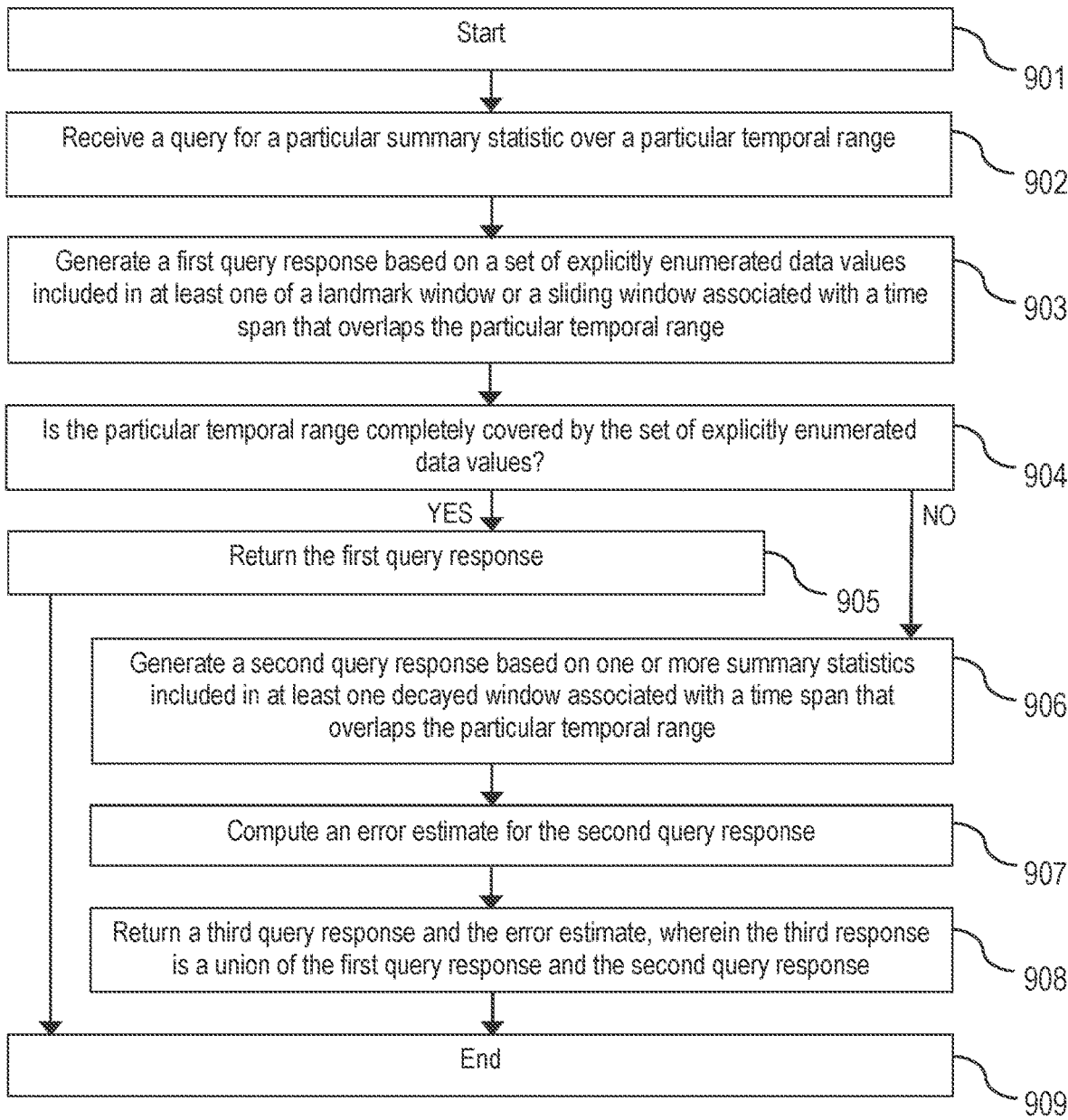
FIG. 8 is a flowchart of an example process for generating a query response based on data maintained by a summary store, in one or more embodiments.

FIG. 8 is a flowchart of an example process 900 for generating a query response based on data maintained by a summary store, in one or more embodiments. In process block 901, the process 900 starts. In process block 902, receive a query for a particular summary statistic over a particular temporal range. In process block 903, generate a first query response based on a set of explicitly enumerated data values included in at least one of a landmark window or a sliding window associated with a time span that overlaps the particular temporal range.

In process block 904, determine whether the particular temporal range is completely covered by the set of explicitly enumerated data values. If the particular temporal range is completely covered by the set of explicitly enumerated data values, proceed to process block 905. If the particular temporal range is not completely covered by the set of explicitly enumerated data values, proceed to process block 906.

In process block 905, return the first query response, then proceed to process block 909.

In process block 906, generate a second query response based on one or more summary statistics included in at least one decayed window associated with a time span that overlaps a portion of the particular temporal range. In process block 907, generate an error estimate for the second query response. In process block 908, return a third query response and the error estimate, wherein the third query response is a union of the first query response and the second query response.

In process block 909, the process 900 ends.

In one embodiment, process blocks 901-909 may be performed by one or more components of the summary store 300, such as, but not limited to, the query engine 350 and the error estimator 360.

Figure 9:
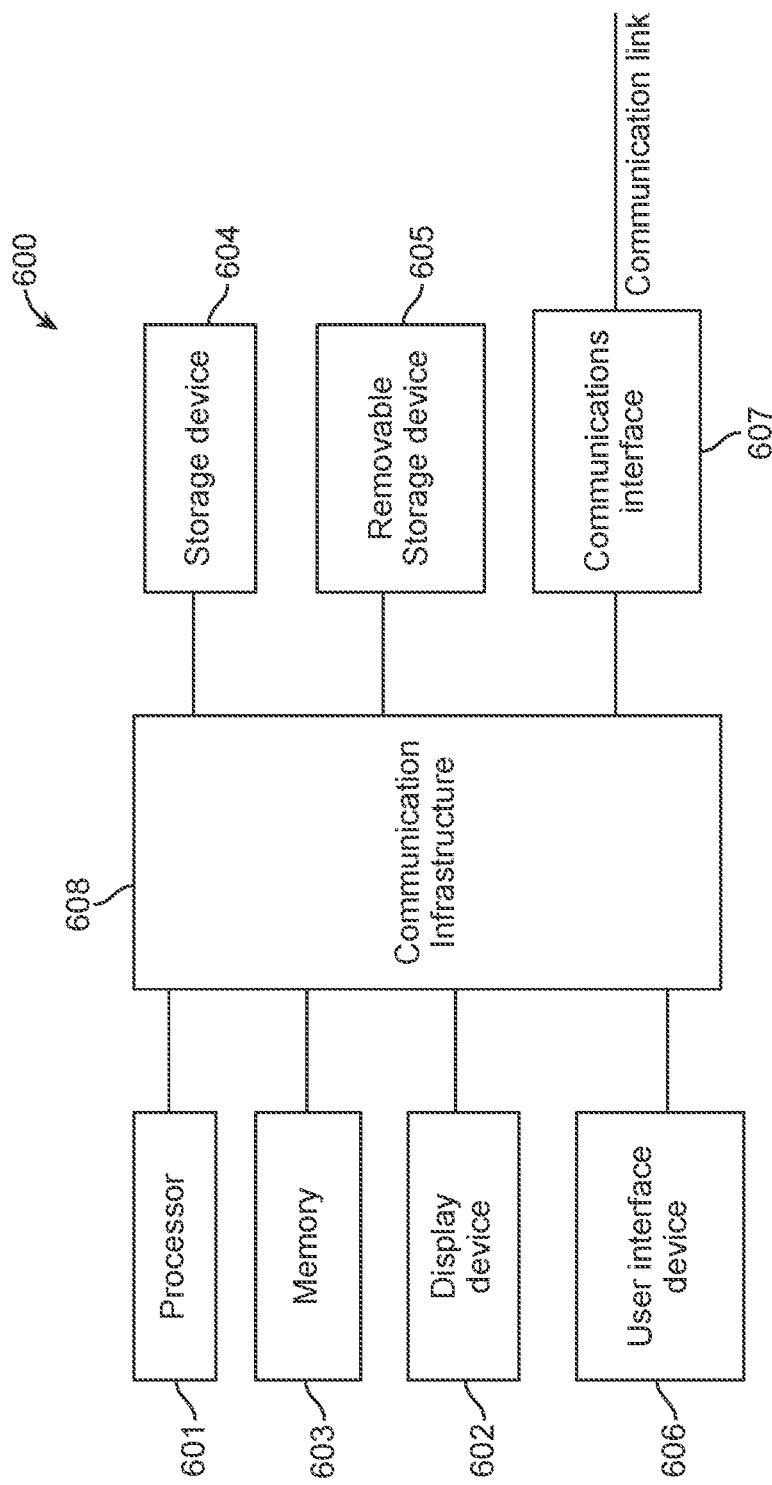
FIG. 9 is an exemplary high-level block diagram showing an information processing system comprising a computer system useful for implementing disclosed embodiments.

FIG. 9 is a high-level block diagram showing an information processing system comprising a computer system 600 useful for implementing the disclosed embodiments. Computer system 600 may be incorporated in a converged device 60, a user device 30, a computing device 50, a cloud computing environment 200, and/or a summary store 300. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 700 (FIG. 6), process 800 (FIG. 7), and process 900 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including a product oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method for managing a data storage system, comprising:
   storing a first set of explicitly enumerated data values included in a data stream from an electronic device in a first window data structure associated with a first time span;
   storing one or more sets of summary statistics in a second set of window data structures, wherein each window data structure of the second set of window data structures is associated with a time span older than the first time span, and the one or more sets of summary statistics are based on a second set of data values included in the data stream; and
   storing a third set of explicitly enumerated data values included in the data stream in a third set of window data structures, wherein each data value of the third set of explicitly enumerated data values is annotated to distinguish the annotated data value from the second set of data values that are unannotated;
   wherein each window data structure is maintained on at least one storage device of the data storage system; and
   wherein the one or more sets of summary statistics reduce operational costs associated with the data storage system.

2. The method of claim 1, wherein the first window data structure comprises a sliding window, the second set of window data structures comprises a sequence of decayed windows, and the third set of window data structures comprises one or more landmark windows.

3. The method of claim 2, wherein each decayed window of the sequence of decayed windows is associated with a different time span and has a different window size than another decayed window of the sequence of decayed windows.

4. The method of claim 3, wherein a decayed window of the sequence of decayed windows is associated with an older time span covering a longer interval of time than another decayed window of the sequence of decayed windows.

5. The method of claim 3, wherein the first set of explicitly enumerated data values is subsumed into the sequence of decayed windows at a decay rate controlled by a pattern of growth of window sizes of the sequence of decayed windows, and the decay rate is configurable.

6. The method of claim 2, further comprising:
   receiving a new data value;
   appending the new data value to a landmark window in response to determining the new data value is annotated;
   enqueuing the new data value in the sliding window; and
   in response to determining a current size of the sliding window exceeds a pre-determined threshold value:
      dequeing an oldest data value maintained by the sliding window;
      updating the one or more sets of summary statistics maintained by the sequence of decayed windows to subsume the oldest data value into the sequence of decayed windows; and
      merging a pair of consecutive decayed windows included in the sequence of decayed windows in response to determining a decay function is satisfied.

7. The method of claim 2, further comprising:
   receiving a query for a particular summary statistic over a particular temporal range;
   generating a first query response based on a particular set of explicitly enumerated elements included in at least one of the sliding window or a landmark window associated with a time span that overlaps the particular temporal range;
   determining whether the particular temporal range is completely covered by the particular set of explicitly enumerated elements;
   in response to determining the particular temporal range is completely covered by the particular set of explicitly enumerated elements:
      returning the first query response; and
   in response to determining the particular temporal range is not completely covered by the particular set of explicitly enumerated elements:
      generating a second query response based on one or more summary statistics included in at least one decayed window associated with a time span that overlaps the particular temporal range;
      generating an error estimate for the second query response, wherein the error estimate is configurable; and
      returning a third query response and the error estimate, wherein the third query response is a union of the first query response and the second query response.

8. The method of claim 1, wherein:
   the operational costs associated with the data storage system include at least one of storage consumption, bandwidth consumption, or latency;
   each annotated data value of the third set of explicitly enumerated data values is more significant than each unannotated data value of the second set of data values; and
   resolution of each annotated data value of the third set of explicitly enumerated data values is higher than each summary statistic of the one or more sets of summary statistics.

9. A data storage system comprising:
   at least one processor; and
   a non-transitory processor-readable memory device storing instructions that when executed by the at least one processor causes the at least one processor to perform operations including:
      storing a first set of explicitly enumerated data values included in a data stream from an electronic device in a first window data structure associated with a first time span;
      storing one or more sets of summary statistics in a second set of window data structures, wherein each window data structure of the second set of window data structures is associated with a time span older than the first time span, and the one or more sets of summary statistics are based on a second set of data values included in the data stream; and storing a third set of explicitly enumerated data values included in the data stream in a third set of window data structures, wherein each data value of the third set of explicitly enumerated data values is annotated to distinguish the annotated data value from the second set of data values that are unannotated;

wherein each window data structure is maintained on at least one storage device of the data storage system; and wherein the one or more sets of summary statistics reduce operational costs associated with the data storage system.

10. The system of claim 9, wherein the first window data structure comprises a sliding window, the second set of window data structures comprises a sequence of decayed windows, and the third set of window data structures comprises one or more landmark windows.

11. The system of claim 10, wherein each decayed window of the sequence of decayed windows is associated with a different time span and has a different window size than another decayed window of the sequence of decayed windows.

12. The system of claim 11, wherein a decayed window of the sequence of decayed windows is associated with an older time span covering a longer interval of time than another decayed window of the sequence of decayed windows.

13. The system of claim 11, wherein the first set of explicitly enumerated data values is subsumed into the sequence of decayed windows at a decay rate controlled by a pattern of growth of window sizes of the sequence of decayed windows, and the decay rate is configurable.

14. The system of claim 10, wherein the operations further comprise:

receiving a new data value;

appending the new data value to a landmark window in response to determining the new data value is annotated;

enqueuing the new data value in the sliding window; and in response to determining a current size of the sliding window exceeds a pre-determined threshold value:

dequeing an oldest data value maintained by the sliding window;

updating the one or more sets of summary statistics maintained by the sequence of decayed windows to subsume the oldest data value into the sequence of decayed windows; and merging a pair of consecutive decayed windows included in the sequence of decayed windows in response to determining a decay function is satisfied.

15. The system of claim 10, wherein the operations further comprise:

receiving a query for a particular summary statistic over a particular temporal range;

generating a first query response based on a particular set of explicitly enumerated elements included in at least one of the sliding window or a landmark window associated with a time span that overlaps the particular temporal range;

determining whether the particular temporal range is completely covered by the particular set of explicitly enumerated elements;

in response to determining the particular temporal range is completely covered by the particular set of explicitly enumerated elements:

returning the first query response; and in response to determining the particular temporal range is not completely covered by the particular set of explicitly enumerated elements:

generating a second query response based on one or more summary statistics included in at least one decayed window associated with a time span that overlaps the particular temporal range;

generating an error estimate for the second query response, wherein the error estimate is configurable; and returning a third query response and the error estimate, wherein the third query response is a union of the first query response and the second query response.

16. A non-transitory computer readable storage medium including instructions to perform a method for managing a data storage system, comprising:

storing a first set of explicitly enumerated data values included in a data stream from an electronic device in a first window data structure associated with a first time span;

storing one or more sets of summary statistics in a second set of window data structures, wherein each window data structure of the second set of window data structures is associated with a time span older than the first time span, and the one or more sets of summary statistics are based on a second set of data values included in the data stream; and storing a third set of explicitly enumerated data values included in the data stream in a third set of window data structures, wherein each data value of the third set of explicitly enumerated data values is annotated to distinguish the annotated data value from the second set of data values that are unannotated;

wherein each window data structure is maintained on at least one storage device of the data storage system; and wherein the one or more sets of summary statistics reduce operational costs associated with the data storage system.

17. The computer readable storage medium of claim 16, wherein the first window data structure comprises a sliding window, the second set of window data structures comprises a sequence of decayed windows, and the third set of window data structures comprises one or more landmark windows.

18. The computer readable storage medium of claim 17, wherein each decayed window of the sequence of decayed windows is associated with a different time span and has a different window size than another decayed window of the sequence of decayed windows.

19. The computer readable storage medium of claim 18, wherein:

a decayed window of the sequence of decayed windows is associated with an older time span covering a longer interval of time than another decayed window of the sequence of decayed windows; and the first set of explicitly enumerated data values is subsumed into the sequence of decayed windows at a decay rate controlled by a pattern of growth of window sizes of the sequence of decayed windows, and the decay rate is configurable.

20. The computer readable storage medium of claim 17, wherein the method further comprises:
- receiving a new data value;
- appending the new data value to a landmark window in response to determining the new data value is annotated;
- enqueuing the new data value in the sliding window; and
- in response to determining a current size of the sliding window exceeds a pre-determined threshold value:
  - dequeing an oldest data value maintained by the sliding window;
  - updating the one or more sets of summary statistics maintained by the sequence of decayed windows to subsume the oldest data value into the sequence of decayed windows; and
  - merging a pair of consecutive decayed windows included in the sequence of decayed windows in response to determining a decay function is satisfied.

* * * * *